Patented Dec. 31, 1935

2,026,492

UNITED STATES PATENT OFFICE 2,026,492

PROCESS OF TREATING PETROLATUM

Harry T. Bennett, Harris H. Hopkins, and Jerry R. Marshall, Tulsa, Okla., assignors to Mid-Continent Petroleum Corporation, Tulsa, Okla., a corporation of Delaware No Drawing. Application October 10, 1932, Serial No. 637,098

3 Claims. (Cl. 196—44)

This invention relates to processes of treating petrolatum, one of the objects being to produce an excellent light colored petrolatum suitable for pharmaceutical and industrial purposes.

Prior to this invention, it has been proposed to treat petrolatum with aluminum chloride to improve its color. However, these old processes have taken considerable time and relatively large quantities of aluminum chloride.

Another object of this invention, therefore, is to provide a process of treating petrolatum with aluminum chloride which may be carried out in a relatively short time with a relatively small quantity of aluminum chloride to produce more desirable results.

A further object of this invention is to provide a catalytic action which will render the action of the anhydrous aluminum chloride on the petrolatum more effective.

In the preferred form of this invention, the petrolatum is treated at a temperature considerably higher than the temperatures heretofore employed; a smaller quantity of anhydrous aluminum chloride is used, and the time of treatment is materially reduced.

During the treatment of the petrolatum with anhydrous aluminum chloride a temperature of not less than 200° F., and not more than 450° F., is preferably maintained. The temperature should be substantially above the melting point of the petrolatum, but not sufficient to cause decomposition, which usually occurs between 450° F. and 500° F. In actual practice we prefer to employ a temperature above 250° F., for example, between 400° F. and 450° F., as the process is most effective when carried out at such high temperatures.

At the high temperatures, a relatively small quantity of anhydrous aluminum chloride may be used to obtain excellent results. The exact quantity of anhydrous aluminum chloride required will depend upon the results desired. However, more than one pound of said chloride for each gallon of petrolatum is not usually necessary, as three-quarters of a pound will produce an excellent product, and even smaller quantities will ordinarily result in a good commercial product having the desired light color.

At the high temperatures employed in our process the time of reaction is materially reduced, and a period of time greater than fifteen minutes, after the last portion of anhydrous aluminum chloride is added to the petrolatum, is usually of little consequence.

As an illustration of one form of this invention, we will show how a petrolatum having the following properties has been treated.

Color, N. P. A. 4—, melting point 141.1, viscosity at 210° F. 109, percent oil 60.5.

The petrolatum was heated to a temperature of 400° F. About one-half pound of anhydrous aluminum chloride for each gallon of petrolatum was added in small portions to the petrolatum. The resultant product was then agitated at said temperature for about fifteen minutes. At the end of this time the resultant product was allowed to settle, and the black sludge which contained undesirable polymerized hydrocarbons and partially reacted aluminum chloride was separated from the petrolatum.

The petrolatum was then contacted with 1½ pounds of contact clay for each gallon of petrolatum for about 10 minutes at 400° F.

The foregoing treatment produced an excellent finished petrolatum having the following properties.

Color N. P. A. 1.5, melting point 142, viscosity at 210° F. 80, percent oil 50.3, percent yield 61.

We have found that by adding a catalyst, such as uranium nitrate to the petrolatum to be treated, the effectiveness of the anhydrous aluminum chloride is increased and the color of the finished petrolatum will be improved.

For example, even when carrying out the process at a relatively low temperature of 200° F., we have found that by adding 0.035 of a pound of uranium nitrate to each barrel of the petrolatum, the color has been changed from N. P. A. 4— in the original petrolatum to 1.5+ in the resultant product.

We claim:

1. The process of treating petrolatum which comprises adding uranium nitrate and anhydrous aluminum chloride to the petrolatum to be treated, agitating the resultant product and separating the resultant sludge from the petrolatum.

2. The process of treating petrolatum which comprises adding uranium nitrate and anhydrous aluminum chloride to the petrolatum to be treated, agitating the resultant product at a temperature above 200° F., separating the resultant sludge from the petrolatum, and neutralizing the petrolatum.

3. The process of treating petrolatum which comprises heating the petrolatum to a temperature not less than 200° F., nor more than 450° F., adding uranium nitrate to said petrolatum, agitating the resultant mixture at said temperature while adding aluminum chloride at a rate not in excess of one pound for each gallon of petrolatum, maintaining said temperature and agitation for a period not greatly in excess of fifteen minutes, then separating the petrolatum from the sludge, and neutralizing and stabilizing said petrolatum by treating the same with clay.

HARRY T. BENNETT.
HARRIS H. HOPKINS.
JERRY R. MARSHALL.